United States Patent [19]

Sanders

[11] Patent Number: 5,761,273
[45] Date of Patent: Jun. 2, 1998

[54] ANALOG SELF-TEST CIRCUITRY FOR A TRUNK INTERFACE

[75] Inventor: Kirk Dow Sanders, San Jose, Calif.

[73] Assignee: Siemens Business Communication Systems, Inc., Santa Clara, Calif.

[21] Appl. No.: 579,493

[22] Filed: Dec. 27, 1995

[51] Int. Cl.[6] .............................. H04M 1/24; H04M 3/08; H04M 3/22
[52] U.S. Cl. .................. 379/22; 379/10; 379/15; 379/29
[58] Field of Search .................... 379/1, 2, 5, 6, 379/21–27, 31, 33–35, 9, 10, 15, 32, 14, 29

[56] References Cited

U.S. PATENT DOCUMENTS

| | | |
|---|---|---|
| 4,679,224 | 7/1987 | Lynch et al. .................. 379/27 |
| 4,937,851 | 6/1990 | Lynch et al. .................. 379/27 |
| 5,157,708 | 10/1992 | Garthwaite et al. ............ 379/21 |
| 5,598,455 | 1/1997 | Bliven et al. ................. 379/27 |

*Primary Examiner*—Curtis Kuntz
*Assistant Examiner*—Binh K. Tieu

[57] ABSTRACT

An integrated circuit is provided for a trunk interface which can test a trunk interface card. Switching circuitry couples tip and ring leads to signal detection circuitry which detects the typical ring and lead signal information. During testing, a test signal is generated which causes the detection circuitry to be coupled to sets of simulated ring and tip test signals which can test the functionality of the integrated circuit and the signal detection circuitry.

13 Claims, 2 Drawing Sheets

5,761,273

1

ANALOG SELF-TEST CIRCUITRY FOR A TRUNK INTERFACE

FIELD OF THE INVENTION

The present invention generally relates to self-test circuitry for a trunk interface which couples a central office to a private branch exchange. More particularly, the invention relates to analog self-test circuitry which verifies the correct functionality of the analog, signal detection circuitry of a central office trunk interface card.

BACKGROUND OF THE INVENTION

A central office trunk (COT) card interfaces the private branch exchange (PBX) to the central office via an analog trunk. The COT card is responsible for both inbound and outbound calls. Typically, the COT card includes four or more channels that are capable of supporting a voice conversation. Each channel of the COT card interfaces with the central office via two wires referred to as tip and ring leads.

The analog trunk can be monitored to, for example, determine whether an inbound call is occurring. When monitoring the state of the analog trunk, four different signals must be detected on the tip and ring leads. These four signals include the ringing signal, tip ground signal, normal battery signal, and reverse battery signal.

The ringing signal appears on the ring lead and typically is a −48 volt DC signal superimposed with an AC sine wave in a frequency range of 15.3 Hz to 68 Hz, and in a voltage range of 40 Vrms to 150 Vrms. Similarly, the tip ground signal appears on the tip lead and resembles a zero potential connected to the tip lead via a small valued resistor. The normal battery signal is present when a DC current greater than 20 mA passes from the tip lead to the ring lead. The reverse battery signal is present when a DC current greater than 20 mA passes from the ring lead to the tip lead.

Conventionally, these four signals have been detected with a variety of analog signal detection circuitry. To date, it has been impractical to implement any type of self test of these detection circuits. For example, for a ringing signal detector, it is very costly to generate a ringing signal on the COT card due to the high voltage involved just to serve a self test function. As a result, the analog detection circuitry present on existing COT cards is not subject to any self testing.

Accordingly, there is a need in the art for feasible analog, signal detection circuitry capable of self testing. Such a circuit would allow service personnel to quickly and easily identify faulty COT cards and replace them without inconveniencing customers.

SUMMARY OF THE INVENTION

The present invention solves the aforementioned problems by providing low cost self-test circuitry in an application specific integrated circuit (ASIC). The software of a PBX system can now test all the analog signal detection circuitry at any time.

According to the present invention, signal detection circuitry can now be subject to self-testing because low voltage input signals can be used, so that simulated signals, such as a ringing signal, can easily be created by using a low voltage in an ASIC. Further, self testing circuitry in an ASIC is less expensive than adding similar discrete circuitry and, it does not appreciably increase the required circuit space on a circuit board.

BRIEF DESCRIPTION OF THE DRAWINGS

A more complete appreciation of the present invention and many of the attendant advantages thereof will be readily obtained as the invention becomes better understood by reference to the following detailed description when considered in connection with the accompanying drawing.

DETAILED DESCRIPTION OF THE PREFERRED EMBODIMENTS

For the sake of convenience, the present invention will be described in terms of a typical trunk interface card used in the PBX. However, it should be understood that the present invention may be used in conjunction with any existing or future COT cards.

Figure 1:
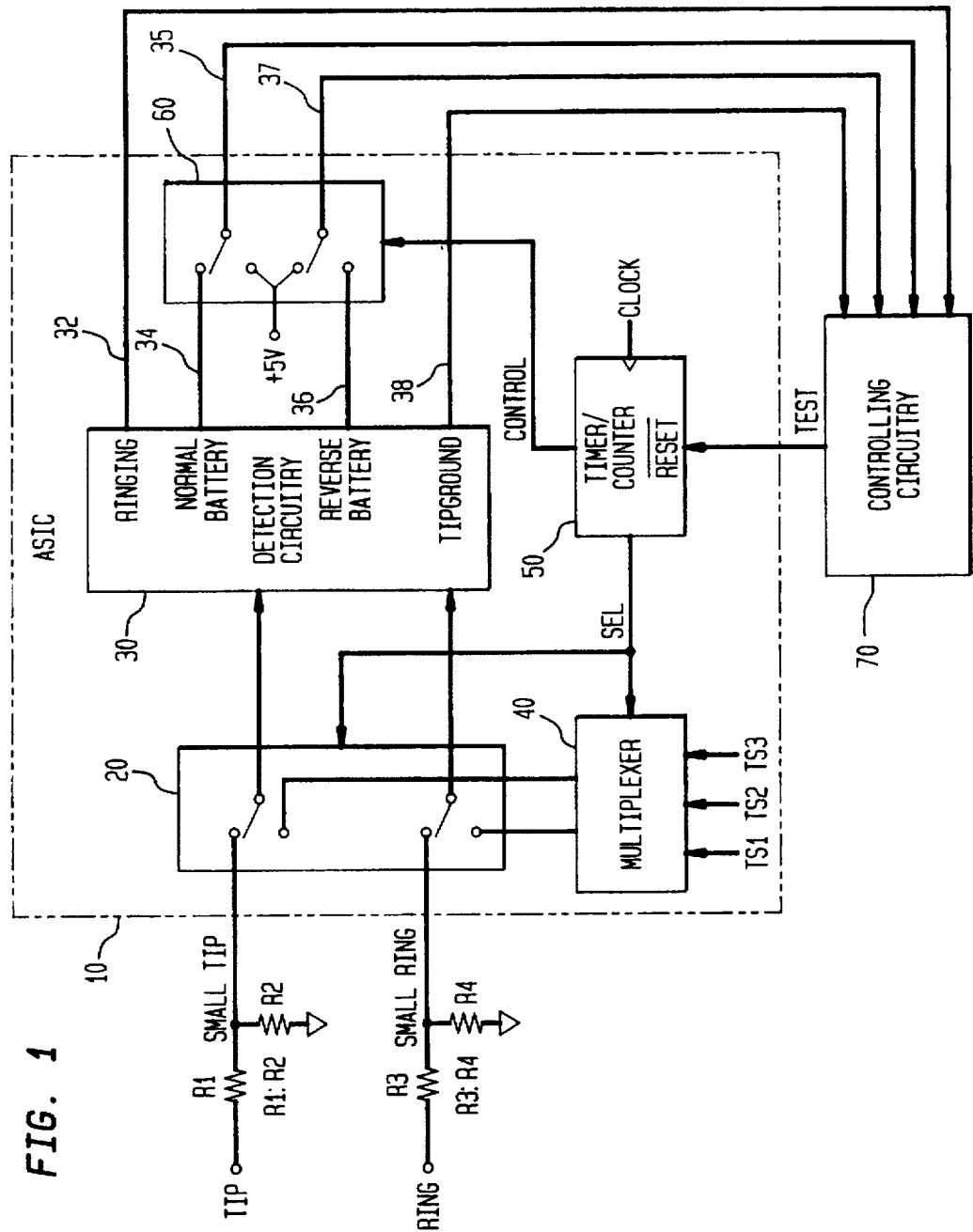
FIG. 1 shows an illustrative embodiment of a circuit according to the present invention.

The present invention will be described with reference to FIG. 1. According to FIG. 1, signals present on the TIP lead and RING lead are divided down by a ratio using, for example, respective voltage divider circuits including resistors R1 and R2 for the signal on the TIP lead and resistors R3 and R4 for the signal on the RING lead. The dividing ratio is dependent on the power supply used with the ASIC 10 and the voltage on the RING lead. According to an illustrative embodiment where Vrms on the RING lead is 150 volts (peak voltage of 212 volts) and the voltage on the power rails of a mixed-signal ASIC 10 is 5 volts and −5 volts, an appropriate dividing ratio would be 100:1 (=R1/R2=R3/R4). Thus, in this illustrative embodiment, the divider circuits lower the tip and ring signals to a value at which they can be processed by a 10 volt ASIC. The divided tip and ring signals shall be referred to as smalltip and smallring signals, respectively. At the divided down levels of the smalltip and smallring signals, signal detection can be implemented inside of the ASIC 10.

The smalltip and smallring signals are input to a switching circuit 20, for example a solid state switching circuit, in the ASIC 10. The switches of the switching circuit 20, when coupled to the TIP and RING leads, couple the smalltip and smallring signals to signal detection circuitry 30. The signal detection circuitry 30 includes four signal detectors which detect one of the four different signals that monitor the state of the analog trunk. These signals include the ringing signal, tip ground signal, normal battery signal, and reverse battery signal. The signal detection circuitry 30 outputs these four signals from the ASIC 10 on detection circuitry output lines 32, 34, 36, 38.

It is to be understood that conventional signal detection circuitry which is used to detect undivided tip and ring signals may be modified and used to detect the divided low voltage tip and ring signals of the present invention.

Output lines 34 and 36 are coupled to switching circuitry 60. The switching circuitry 60 passes the normal battery signal and reverse battery signal on lines 34, 36 to the controlling circuitry 70 via lines 35, 37, respectively, when in a normal operation mode or a self test mode. Output lines 32, 38 pass the ringing signal and tip ground signal outputs to controlling circuitry 70.

To implement a self-test of the signal detection circuitry 30, the smalltip and smallring signals are disconnected from the signal detection circuitry 30. Specifically, the switches of the switching circuitry 20 are switched to couple the signal detection circuitry 30 to the signal lines from a multiplexer 40 in response to a received selection signal SEL. The multiplexer 40 also receives, as inputs, one or more sets of test signals. In the illustrative embodiment, the multiplexer 40 receives three sets of test signals, TS1, TS2, and TS3. The selection signal SEL identifies the appropriate test signal set to be outputted by the multiplexer 40 for activating the signal detection circuitry 30. If only one set of test signals is input to the multiplexer 40 for analysis, multiplexer 40 can be replaced by a latch.

The test signals, according to one embodiment, are designed to test for positive activation and false activation of the four signals. Since there are four different signals of interest, some of which are mutually exclusive, the four signal detectors in the signal detection circuitry 30 cannot be activated at the same time. Thus, to test all the signals for both positive and false activation, three different sets of test signals TS1, TS2, and TS3, are activated sequentially. Activation of one or two different sets of test signals has been found to provide inadequate test coverage for testing all the signals. However, one or two sets of test signals could be used to test less than all the signals for false activation and/or positive activation. Activation of four sets of test signals can be done for additional testing, but would exceed the minimum number of test signals required to test the four signals for positive and false activation.

A timer/counter 50 generates and inputs the selection signal SEL to multiplexer 40, for controlling the sequential selection of the appropriate test signals TS1, TS2, and TS3, and to switching circuitry 20. The duration for each test signal set TS1, TS2, and TS3 input to the multiplexer 40 is controlled by a clock signal input to the timer/counter 50 to ensure that the signal detection circuitry 30 has sufficient time to adequately detect the test signal set. According to an exemplary embodiment, an adequate duration is approximately 200 msec per test signal set.

To initiate the testing operation for a self test mode, controlling circuitry 70 inputs a test signal TEST to the ASIC 10 and more specifically, to the timer/counter 50, as a reset signal. Controlling circuitry 70 is typically located on the same circuit board as the ASIC 10 and may include a microprocessor and/or logic circuitry. According to an illustrative embodiment, when TEST is low, a test will not run and ASIC 10 will operate in a normal operation mode and exhibit normal signal detection functionality. When TEST is high, the tests will run repeatedly until TEST goes low. Whenever TEST goes from high to low, the self test will end and normal operation will resume, regardless of whether all test sets have been completed.

The divided-down tip ground signal, normal battery signal, and reverse battery signal can be simulated with simple, low voltage DC signals. Although the divided-down ringing signal is defined as a sine wave, it can be simulated with a low voltage square wave such as a divided-down clock signal. Thus, all the test signals can be created easily and cheaply.

Often it is desirable to verify that the interface between the ASIC and its external, controlling circuitry 70 is fully functional. Typically, to verify that the interface is fully functional, tests are performed when the COT card is idle. The COT card is idle when no voice connection exists or when no voice connection is being established. The above-described self-test method disconnects the smalltip and smallring signals from the detection circuitry 30. However, this prevents the COT from knowing whether an inbound call is occurring during the test. Thus, this test is inappropriate for verifying the functionality of the interface because delays in answering calls can occur if the smalltip and smallring signals are disconnected from the detection circuitry 30.

To overcome this problem, the above-described self test scheme can be modified. The modified self test scheme will be referred to herein as an interface functionality test mode. When the TEST signal is high, the ASIC 10 does not initially disconnect the smalltip and smallring signals from the detection circuitry 30. Thus, ringing signal and tip ground signal detection can operate so that incoming calls can be detected.

For a short duration, e.g., 32 msec, when TEST is first high, the ASIC outputs 35, 37, which indicate positive detection of the normal battery signal and reverse battery signal, respectively, will both be high. Since these signals are mutually exclusive, both signals are normally not the same outside of this test. When the controlling circuitry 70 of the ASIC 10 detects that both the normal battery signal on line 35 and reverse battery signal on line 37 are high, it will be a positive verification that the interface between the ASIC 10 and the controlling circuitry 70 is fully functional. At this time, if no further testing is desired, the controlling circuitry 70 forces the TEST signal low to end the test, and return the ASIC 10 to normal operation.

Otherwise, if TEST does not go low after concluding the interface functionality test, the self-test mode will be entered, as described above with three independent sets of tests being applied sequentially to the detection circuitry 30 while the smalltip and smallring signals are disconnected therefrom. In a power on diagnostics self test according to the present invention, the interface functionality test is carried out followed by the self test scheme. Thus, when the TEST signal stays high, the power on diagnostics self test of the signal detection circuitry 30 of the COT continues.

The power on diagnostics self test is carried out according to the following description. First, in the interface functionality test, a high TEST signal is applied to the timer/counter 50. A control signal generated by the timer/counter 50 is forwarded to a switching circuit 60 based on a clock signal input to the timer/counter 50. Responsive to the control signal, the switching circuit 60 switches to an interface functionality test mode. In the interface functionality test mode, the normal battery output 34 and the reverse battery output 36 are coupled to a power supply voltage (e.g. 5 volts) for approximately 32 msec. After 32 msec has gone by, the interface functionality test ends and the control signal causes the switching circuit 60 to go to a self test mode in which the normal battery signal and reverse battery signal are mutually exclusive and coupled to the detection circuitry 30 rather than the power supply voltage.

Next, the smalltip and smallring signals will be disconnected from the detection circuitry 30. At this time, the timer/counter 50 generates the selection signal SEL and inputs this signal to the multiplexer 40 to select the first set of test signals TS1. The test signals TS1 cause a predetermined pattern to appear at the four detector outputs 32, 34, 36, 38 coupled to the controlling circuitry 70 if the detection circuitry 30 is operating correctly.

Following approximately 200 msec, the selection signal SEL generated by timer/counter 50 changes to select the second set of test signals TS2 to replace the first set of test signals TS1. The second set of signals TS2 are then applied to the detection circuitry 30 to test the circuitry in another way. After another period of approximately 200 msec, the selection signal SEL changes again and the third set of test signals TS3 replaces the second set of test signals TS2. The test signals TS3 are applied to the signal detection circuitry 30 to test the circuitry in yet another way. Once another period of approximately 200 msec occurs, the controlling circuitry 70 can set the TEST signal low and return the ASIC 10 to a normal operation mode where the TIP and RING leads are reconnected to the switching circuitry 20. Also, the test can be repeated indefinitely by maintaining the TEST signal input from the controlling circuitry 70 at HIGH.

The controlling circuitry 70 determines the operating status of the ASIC 10 from the output signals on the output lines 32, 35 via 34, 37 via 36, 38. If there is no problem detected, the controlling circuitry 70 forces the TEST signal low so that normal operation can continue. In the event, an error is detected the controlling circuitry 70 generates an error signal. The error signal may be further processed or provide an indication as to where a problem in the circuitry exists.

Figure 2:
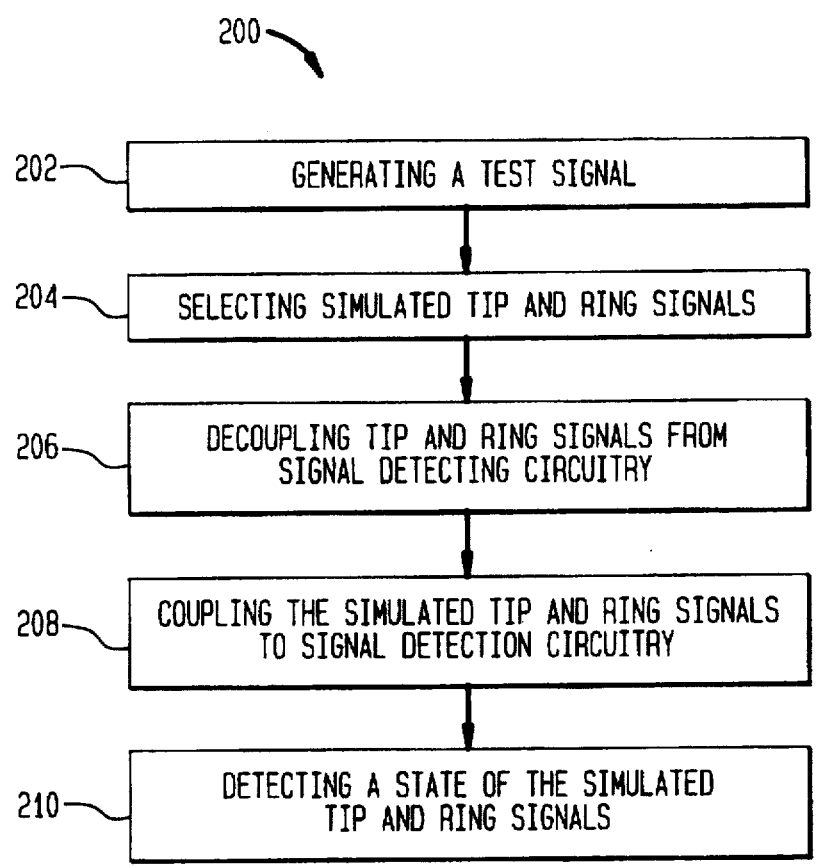
FIG. 2 shows a flow chart depicting a method of the invention.

A method 200 of the invention is depicted in FIG. 2. A test signal is generated at a step 202. Simulated tip and ring signals are selected at a step 204. The tip and ring signals are decoupled from signal detecting circuitry 30 at a step 206. The simulated tip and ring signals are then coupled to the signal detection circuitry at a step 208. A state of the simulated tip and ring signals is detected, at a step 210.

Although illustrative embodiments of the present invention have been described in detail with reference to the accompanying drawings, it is to be understood that the invention is not limited to those precise embodiments and that changes and modifications may be effected therein by those in the art without departing from the scope and spirit of the invention.

What is claimed is:

1. A self test circuit, coupled to controlling circuitry which generates a test signal, for a trunk interface, comprising:
    a timer/counter circuit for receiving the test signal from said controlling circuitry and generating a selection signal, the selection signal indicating a test mode or a normal operation mode;
    a multiplexer circuit for receiving and outputting simulated tip and ring signals responsive to the selection signal when in the test mode;
    switching circuitry, responsive to the selection signal, for receiving and outputting a tip signal and a ring signal when in the normal operation mode and the simulated tip and ring signals when in the test mode, wherein the tip and ring signals received by said switching circuitry have been divided down by a voltage divider circuit; and
    detection circuitry, coupled to said switching circuitry, for detecting a state of the tip and ring signals during the normal operation mode and detecting a state of the simulated tip and ring signals during the test mode, wherein during the test mode said controlling circuitry receives the detected states of the simulated tip and ring signals.

2. The circuit according to claim 1, wherein there are three test sets of the simulated tip and ring signals which are output sequentially by said multiplexer circuit when in the test mode.

3. The circuit according to claim 1, wherein the ring and tip signals include a ringing signal, a tip ground signal, a normal battery signal, and a reverse battery signal.

4. A self test circuit, coupled to controlling circuitry which generates a test signal, for a trunk interface, comprising:
    a timer/counter circuit for receiving the test signal from said controlling circuitry and generating a control signal, the control signal indicating a test mode or a normal operation mode;
    detection circuitry for detecting a state of ring and tip signals including a state of a normal battery signal and a state of a reverse battery signal and outputting the detected states of the normal battery signal and the reverse battery signal; and
    switching circuitry, responsive to the control signal, for coupling said controlling circuitry to the detected states of the normal battery signal and the reverse battery signal when in a normal operation mode, and to a power supply voltage when in the test mode.

5. The circuit according to claim 4, wherein said detection circuitry can detect an incoming call when in the test mode.

6. A self test circuit, coupled to controlling circuitry which generates a test signal, for a trunk interface, comprising:
    a timer/counter circuit for receiving the test signal from said controlling circuitry and generating a selection signal and a control signal, the selection signal indicating a first test mode or a normal operation mode and the control signal indicating a second test mode or non-second test mode;
    a multiplexer circuit for receiving and outputting simulated tip and ring signals responsive to the selection signal when in the first test mode;
    first switching circuitry, responsive to the selection signal, for receiving and outputting a tip signal and a ring signal when in the normal operation mode and the simulated tip and ring signals when in the first test mode;
    detection circuitry, coupled to said first switching circuitry, for detecting a state of the tip and ring signals during the normal operation mode and a state of the simulated tip and ring signals during the first test mode; and
    second switching circuitry, responsive to the control signal, for coupling said controlling circuitry to the detected states of a normal battery signal and a reverse battery signal included in the ring and tip signals when in a normal operation mode, to the detected states of a simulated normal battery signal and a simulated reverse battery signal included in the simulated tip and ring signals when in the first test mode, and to a power supply voltage when in the second test mode,
    wherein during the first test mode said controlling circuitry receives the detected states of the simulated tip and ring signals.

7. The circuit according to claim 6, wherein there are three test sets of the simulated tip and ring signals which are output sequentially by said multiplexer circuit when in the first test mode.

8. The circuit according to claim 6, wherein the tip and ring signals received by said first switching circuitry have been divided down by a voltage divider circuit.

9. A method for verifying functionality of signal detection circuitry in a trunk interface card, said method comprising the steps of:
    generating a test signal indicating a test mode;
    dividing down a tip signal and a ring signal by a voltage divider circuit;
    decoupling said tip signal and said ring signal from signal detecting circuitry responsive to the test signal;
    selecting simulated tip and ring signals responsive to the test signal;
    coupling the simulated tip and ring signals to the signal detection circuitry responsive to the test signal; and
    detecting a state of the simulated tip and ring signals.

10. The method of claim 9, wherein said step of selecting simulated tip and ring signals includes selecting one of three test sets of the simulated tip and ring signals, sequentially.

11. A method for verifying functionality of signal detection circuitry in a trunk interface card, said method comprising the steps of:

generating a test signal indicating a test mode;

decoupling, responsive to the test signal, a detected normal battery signal according to tip and ring signals from a first signal line coupled to controlling circuitry and a detected reverse battery signal according to ring and tip signals from a second signal line coupled to the controlling circuitry; and coupling said first and second signal lines, to a power supply voltage responsive to the test signal.

12. The method of claim 11, further comprising the step of detecting signals on said first and second signal lines at said controlling circuitry.

13. The method of claim 11, wherein the signal detection circuitry can detect an incoming call during a test performed in response to the test signal.

* * * * *